US012681745B2

(12) United States Patent
Ge et al.

(10) Patent No.: US 12,681,745 B2
(45) Date of Patent: Jul. 14, 2026

(54) MULTI-USER VIRTUAL MACHINE PLATFORM

(71) Applicant: Microsoft Technology Licensing, LLC, Redmond, WA (US)

(72) Inventors: Chunyuan Ge, Shanghai (CN); Kunfu Zhong, Suzhou (CN); Liu He, Suzhou (CN); Bhavya Chopra, Issaquah, WA (US); Ge Shen, Suzhou (CN); Jie Liu, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 709 days.

(21) Appl. No.: 18/099,899

(22) Filed: Jan. 20, 2023

(65) Prior Publication Data

US 2024/0248735 A1      Jul. 25, 2024

(51) Int. Cl.
*G06F 9/455* (2018.01)

(52) U.S. Cl.
CPC .................... *G06F 9/45558* (2013.01); *G06F 2009/45583* (2013.01); *G06F 2009/45595* (2013.01)

(58) Field of Classification Search
CPC .. G06F 9/5027; G06F 9/44505; G06F 9/5072; G06F 2209/5011; G06F 9/5077; G06F 2209/505
See application file for complete search history.

(56) References Cited

U.S. PATENT DOCUMENTS

| | | | | |
|---|---|---|---|---|
| 2005/0198387 A1* | 9/2005 | Willis | ................. | H04L 61/2525 |
| | | | | 709/227 |
| 2011/0119390 A1* | 5/2011 | Leech | ................. | H04L 12/4679 |
| | | | | 709/228 |
| 2013/0093776 A1* | 4/2013 | Chakraborty | ........... | G06F 9/452 |
| | | | | 345/520 |
| 2017/0083354 A1* | 3/2017 | Thomas | ................ | G06F 9/5061 |
| 2020/0034169 A1* | 1/2020 | Deore | ................. | G06F 9/45558 |
| 2020/0210069 A1* | 7/2020 | Singh | .................. | G06F 13/4265 |
| 2023/0333905 A1* | 10/2023 | Kelly | .................... | G06F 9/5088 |

OTHER PUBLICATIONS

"International Search Report and Written Opinion for PCT Patent Application No. PCT/US2023/083715", Mailed Date: Mar. 6, 2024, 14 pages.

International Preliminary Report On Patentability received for PCT Application No. PCT/US2023/083715, mailed on Jul. 31, 2025, 09 pages.

* cited by examiner

*Primary Examiner* — Kenneth Tang

(74) *Attorney, Agent, or Firm* — Shook, Hardy & Bacon L.L.P.

(57) ABSTRACT

A multi-user virtual machine (VM) system is disclosed herein. Upon receiving a user login, first persistent storage and a first network interface card (NIC) are attached to a VM, where the VM operates as a personal computing device of a first user. Upon receiving a logout request for the user, the first persistent storage and the first NIC are detached from the VM. Thereafter, a second login is received, and second persistent storage and a second NIC are attached to the VM, where the VM operates as a personal computing device of a second user.

20 Claims, 6 Drawing Sheets

Figure 2:
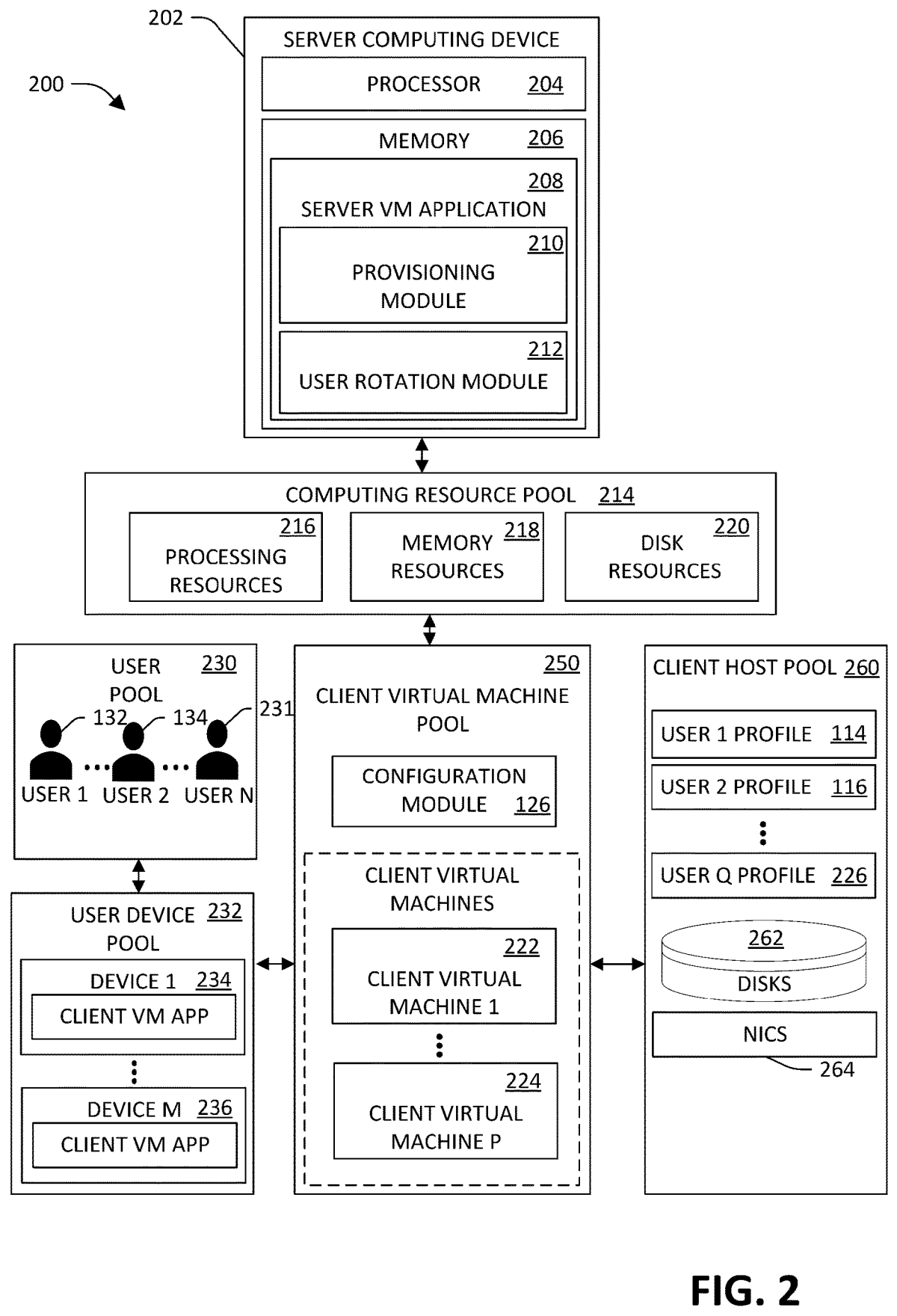

200 →

202 —

SERVER COMPUTING DEVICE

PROCESSOR    204

MEMORY    206

208
SERVER VM APPLICATION

210
PROVISIONING MODULE

212
USER ROTATION MODULE

COMPUTING RESOURCE POOL    214

216
PROCESSING RESOURCES

MEMORY    218
RESOURCES

220
DISK RESOURCES

USER POOL    230

132    134    231

USER 1    USER 2    USER N

USER DEVICE    232
POOL

DEVICE 1    234

CLIENT VM APP

DEVICE M    236

CLIENT VM APP

250
CLIENT VIRTUAL MACHINE POOL

CONFIGURATION MODULE    126

CLIENT VIRTUAL MACHINES

222
CLIENT VIRTUAL MACHINE 1

224
CLIENT VIRTUAL MACHINE P

CLIENT HOST POOL 260

USER 1 PROFILE    114

USER 2 PROFILE    116

USER Q PROFILE    226

262
DISKS

NICS

MULTI-USER VIRTUAL MACHINE PLATFORM

BACKGROUND

A virtual machine (VM) is backed by hardware resources (e.g., processor cores, memory, storage) and provides the functionality of a physical computer without the need for the hardware resources to be co-located with a user of the hardware resources. To use a VM, a user only needs a computing device capable of connecting to a computing system that hosts the VM (e.g., by way of a network). The VM executes its own operating system and software applications, even applications that otherwise would be unable to be run on the user device due to hardware or other limitations of the user device.

An organization may choose to employ VMs and relatively thin client devices (i.e., with a relatively small local hard drive or no local hard drive at all) to avoid costs associated with more expensive computer hardware, to allow for flexibility when computing needs change (e.g., an organization can increase, reduce and/or add or remove VMs and associated computing resources assigned to the organization relatively quickly), and to offload maintenance to a provider of the VMs (such that the provider is tasked with ensuring that security updates are made, that software updates are installed, and so forth). The VM provider allocates computing resources for the VMs from a pool of computing resources managed by the service provider. Conventionally, the organization outlines, for users of the organization who employ VMs, computing resources desired for the VMs, and the service provider creates VMs for the users in the organization. Thus, in an example, each user has their own dedicated VM executing remotely and accessible by way of a network connection.

After a VM is created by the service provider for a user, conventionally, the VM is up and running at all times, regardless of if the user is logged in and using the VM. For example, a service level agreement (SLA) between the organization and the service provider typically requires that the VM be available to the user a high percentage (e.g., above 99%) of the time. This approach results in a notable waste of resources at the VM provider, as the resources required to execute the VM are allocated even when the user is not using the VM (such as outside of the normal working hours of the user). This problem is exacerbated for organizations employing shift workers because a VM is allocated for each user, even if co-located users would otherwise share the use of a physical workstation according to their shifts.

A workaround of this limitation for organizations that have multiple shifts of workers is to create a single user profile that represents multiple workers on different shifts and have a VM created for that user profile. This workaround, however, is associated with data security concerns, as the VM provides no suitable mechanism for partitioning data of one user from data of another user. Conventional VM implementations have failed to provide an efficient and secure VM environment for multiple users.

SUMMARY

The following is a brief summary of subject matter that is described in greater detail herein. This summary is not intended to be limiting as to the scope of the claims.

Described herein are various technologies related to a multi-user VM platform, where a VM is assigned to multiple user profiles. According to an exemplary embodiment, the multi-user VM platform comprises hardware resources (e.g., server racks including processors and memory, computer storage nodes that can include disks, solid state drives), a client VM pool, and a client host pool. The client VM pool comprises a VM that is backed by a portion of the hardware resources. VMs are created in the client VM pool according to computing resource requests specified by an organization. VM specifications may vary according to processing power (e.g., a number of dedicated processor cores that the VM is to have), memory, disk size (e.g., an amount of storage that the VM is to have), and disk type (e.g., solid state drive, hard disk drive). Once created, the VM becomes part of the client VM pool and is available for use by the organization.

In an example, an organization has a first user and second user that work in shifts (e.g., the first user works a first shift and a second user works a second shift that does not overlap with the first shift). Since the users work in different, non-overlapping shifts, their use of computing resources while working does not overlap. The two users have two respective user profiles, and the two user profiles are assigned to a single client VM in the client VM pool. The users may access the client VM via a user computing device executing a client application configured to interact with the client VM. The user computing device may be the same device shared between the users or each user may have their own computing device, each with a client application installed thereon.

A user computing device has a processor and a memory, where the memory has a client application stored therein that can be used to access a client VM. For example, the client application can be a browser or an application that is dedicated to establishing and maintaining a connection with the client VM. When executed by the processor, the client application sends a login request to a computing system that includes the client VM. The login request comprises user credentials for a user profile of a user of the client application and/or other information that identifies the user profile of the user. The client VM receives the request and initiates a user login process via a configuration module.

The multi-user VM platform executes the configuration module. The configuration module receives login and logout requests from the client application. Continuing with the above example, the configuration module receives a login request from the client application responsive to a user attempting to access the client VM from a client computing device at the beginning of a shift of the user. The configuration module determines, based upon the login request (e.g., based upon user credentials included in the request), that the request is associated with a first user profile. Other aspects of the login request may be used to identify and/or authenticate the user, such as a time and date that a particular user is scheduled to work (e.g., according to their assigned shift), a geolocation associated with the organization, an IP address or the like associated with the organization, etc.

Upon the user credentials being validated and based upon at least some of the user credentials (e.g., an identifier), the configuration module accesses the first user profile from a set of user profiles. The first user profile comprises an identifier for first persistent storage (referred to herein as a first disk) assigned to the first user profile and optionally includes an identifier for a first network interface card (NIC). The disk may comprise operating system configuration information, files, applications, and the like, where such parameters are associated with the first user. The disk is unique to the first user profile and therefore includes information that can preserve the configuration of the computing environment for the first user each time the user accesses the VM with the user credentials.

Once the identifiers for the first disk and first NIC are obtained from the first user profile, the configuration module attaches the first disk and the first NIC to the client VM. In an example, when the first user profile does not include an identifier for a NIC, the first NIC is selected from a set of available NICs. The configuration module then assigns the first user profile as the session host of the client VM. After attachment of the first disk and the first NIC to the client VM, the client VM is available for use by the first user via the application. When the first disk and first NIC identified in the first user profile are attached to the client VM, the computing environment has configurations (e.g., displayed graphical icons, applications installed, files stored) that are specified in data stored in the first disk. Furthermore, use of a distinct NIC for each user profile results in a distinct media access control (MAC) address for each user profile. Accordingly, access to content can be restricted based upon MAC address, which can be specific to a NIC (and thus to a respective user).

When the first user's shift is complete, the client application sends a logout request, and the logout request is received by the configuration module. Responsive to the logout request being received, the configuration module detaches the first disk and the first NIC from the client VM and deletes the first user profile as the current session host.

After the first user has been logged out of the client VM, the client application can receive second login credentials set forth by the second user, where the second login credentials correspond to a second user profile. Upon receiving the second login credentials, the configuration module accesses the second user profile from the set of user profiles. The second user profile identifies a second disk and optionally a second NIC. The second disk identified in the second user profile is unique to the second user profile and therefore configuration of the computing environment for the second user can be preserved across accesses to the client VM.

The configuration module may then attach the second disk and second NIC identified in the second user profile to the client VM and enable the second user to use the client VM via the client application. The second user profile is then assigned as the session host of the client VM. When the second user's shift ends, the client VM sends a logout request that is received by the configuration module, and the configuration module may then detach the second disk and the second NIC associated with the second user profile. The second user profile is further deleted as the current session host. The above-described user rotation process may be repeated for each shift transition between users that submit authentication for user profile information at shift transitions.

The exemplary technologies described herein exhibit various advantages over conventional technologies. In conventional VM environments, client VMs must be created for each user registered with a service provider in an organization and the client VMs must be continuously available for the users, regardless of current user activity. Thus, processing and memory resources are allocated to a user profile 24 hours a day, and therefore in an organization that staggers employees/users according to shifts, the conventional VM platform allocates processing and memory resources for every user that may access a VM, with each VM remaining active even when a user assigned to the VM is not working. Through the use of the technologies described herein, computational resources are preserved and the computation efficiency of a shared computing resource pool is improved.

Conventional shared computing environments further suffer from a lack of data security. Further, in a conventional shared VM scenario, users that share permissions may be able to access data of another user of a VM. By attaching and detaching user-specific disks, this data security problem is overcome.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the detailed description of the illustrated embodiments, which is to be read in connection with the accompanying drawings.

BRIEF DESCRIPTION OF THE DRAWINGS

FIG. 2 is a functional block diagram of another multi-user VM platform.

DETAILED DESCRIPTION

Described herein are various technologies pertaining to a multi-user virtual machine ("VM") platform. The platform comprises a client VM pool comprising client VMs and a client host pool comprising persistent storage (disks) and network interface controllers (NICs) for different users in an organization. By separating the pool of VMs from disk and NIC pairs, the platform supports an efficient and secure rotation of user access of a shared VM. Further advantages over conventional VM environments are realized through the use of the VM pool that employs fewer computational resources to be dedicated to support an organizational user base and therefore improves the computational efficiency of a shared computing resource pool.

In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Further, as used herein, the term "exemplary" is intended to mean serving as an illustration or example of something and is not intended to indicate a preference.

Further, as used herein, the terms "component", "system", and "module" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Figure 1:
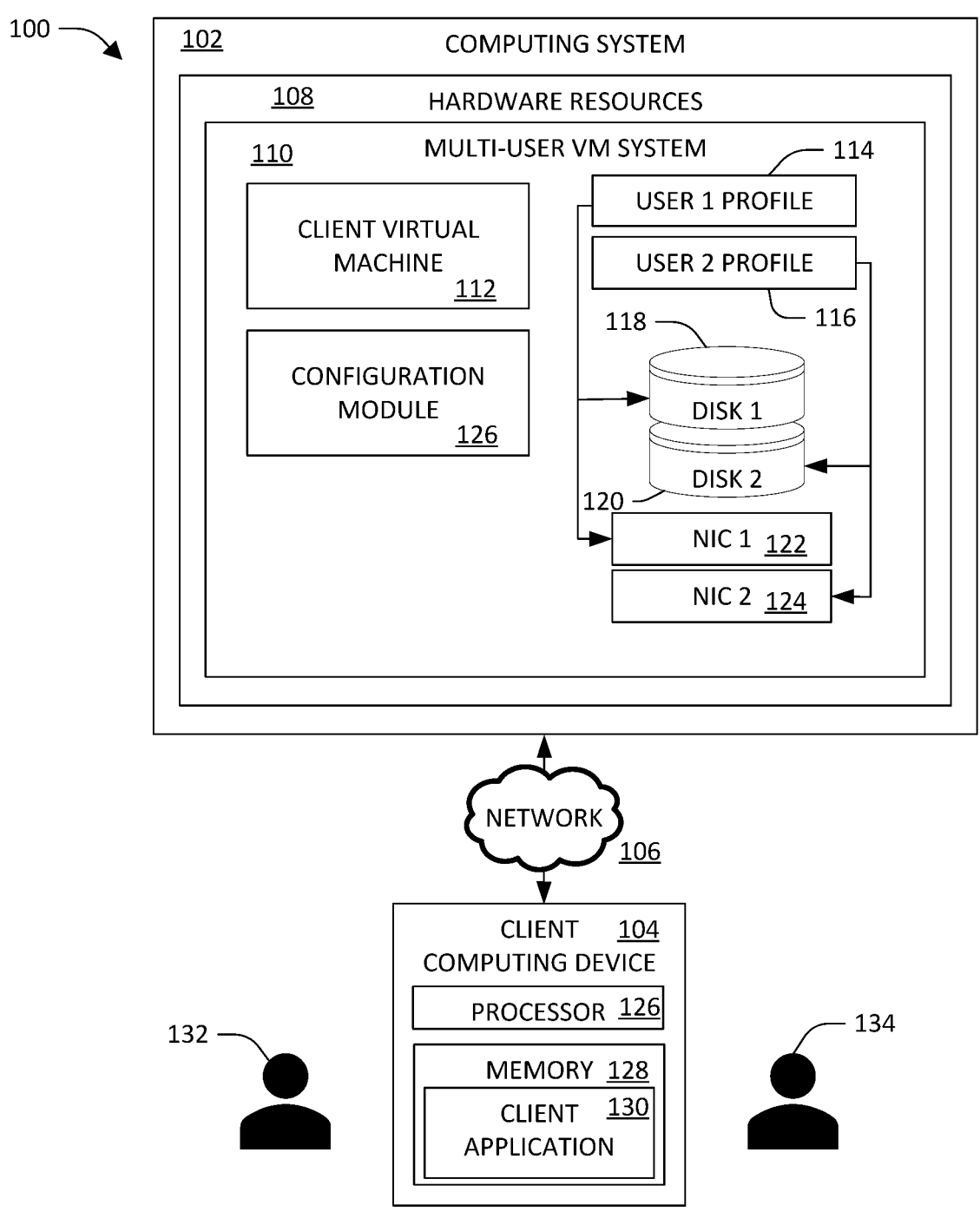
FIG. 1 is a functional block diagram of a multi-user VM platform.

With reference to FIG. 1, an exemplary multi-user VM platform 100 is illustrated. The platform 100 comprises a computing system 102 and a client computing device 104, where the computing system 102 and the client computing device 104 are in communication with one another by way of a network 106. The computing system 102 can be a data center, can be included in a data center, can be distributed among several data centers, etc. Accordingly, the computing system 102 includes hardware resources 108, where the hardware resources 108 include server racks, temperature regulators (fans, humidifiers, air conditioners, etc.), routers, switches, security systems, power sources, and so forth. The client computing device 104 can be any suitable type of client computing device, including a desktop computing device, a tablet (slate) computing device, a mobile telephone, headgear (such as virtual reality or augmented reality headgear), etc.

The computing system 102 includes a multi-user VM system 110, where the multi-user VM system 110 is backed by the hardware resources 108 of the computing system 102. For example, the multi-user VM system 110 can include a hypervisor and other virtualization software that facilitates instantiation of VMs on the computing system 102. The multi-user VM system 110 has a persisted client VM 112 instantiated thereon. As will be described in greater detail herein, the client VM 112 is assigned to an organization that includes several users, where the several users may desire access to the client VM 112 at different, non-overlapping times. The client VM 112 is constructed according to specifications set forth by the organization, such that the client VM 112 is backed by a specific number of processor cores, is allocated a threshold number of processing cycles over some period of time, is allocated a specified amount of memory, and so forth.

The multi-user VM system 110 further stores profiles for users of the organization who have access to the client VM 112 (or other client VMs instantiated at the multi-user VM system 110). As illustrated in FIG. 1, the profiles include a first user profile 114 and a second user profile 116. Content of the user profiles 114 and 116 will be described in greater detail below.

The multi-user VM system 110 also includes disks 118-120 that are assigned to the organization and have sizes specified by the organization, where the disks 118-120 represent portions of persistent storage. Therefore, the first disk 118 can represent a portion of a computer-readable storage device (such as a hard drive, a solid-state drive, or other suitable storage), an entirety of a computer-readable storage device, portions of several computer-readable storage devices, or entireties of several computer-readable storage devices. The persistent storage represented by the first disk 118 is non-overlapping with the persistent storage represented by the second disk 120.

The multi-user VM system 110 further includes NICs 122-124 that are assigned to the organization. In an example, the NICs 122-124 are virtual NICs that correspond to at least one physical NIC of the computing system 102. In another example, the NICs 122-124 are physical NICs.

The multi-user VM system 110 also includes a configuration module 126 that customizes the client VM 112 for a user profile by attaching and detaching disks to and from the client VM 112 and by attaching and detaching NICs to and from the client VM 112. While illustrated as being external to the client VM 112, it is understood that a client VM persisted on the multi-user VM system 110 can include an instance of the configuration module 126.

The client computing device 104 has a processor 127 and memory 128, where the memory 128 has a client application 130 stored therein, and further where the client application 130 is executed by the processor 127. The client application 130 is configured to communicate with the multi-user VM system 110 and establish a connection with the client VM 112. Thus, the client application 130 can be a web browser (provided with a Uniform Resource Locator (URL) for the multi-user VM system 110) or an application that is dedicated to communicating with the multi-user VM system 110.

In the present example, the client computing device 104 is operated by two different users (a first user 132 and a second user 134) at non-overlapping times. For example, the first user 132 can be assigned to work a first shift at a healthcare facility while the second user 134 can be assigned to work a second shift at the healthcare facility, where the first and second shifts do not overlap. Therefore, the client computing device 104 is not simultaneously operated by the first user 132 and the second user 134. In another example, the first user 132 and the second user 134 can work different shifts at a same facility (or same geographic region) and have their own client computing device; however, the client computing devices of the users 132 and 134 are not employed to simultaneously establish a connection with the client VM 112. In still yet another example, an organization that employs the first user 132 and the second user 134 may have facilities in different geographic regions (e.g., different cities, different states, different countries), and the first user 132 may be assigned to work at a shift that does not overlap with a shift of the second user 134 (e.g., due to a time difference between the geographic regions). In summary, while FIG. 1 illustrates the client computing device 104 being employed by both users 132 and 134, it is to be understood that the two users 132 and 134 can use separate client computing devices, where each of the client computing devices executes a client application that can be used to access the client VM 112.

Operation of the multi-user VM platform 100 is now set forth. At time $T_0$, there is no established connection between the client computing device 104 and the client VM 112. At time $T_1$, the client application 130 is initiated on the client computing device 104 and the client application 130 receives first user credentials from the first user 132; the first user credentials can be or include a first username, a first password, first biometric information, etc. The client application 130 causes the client computing device 104 to transmit the first user credentials to the computing system 102 by way of the network 106. The multi-user VM system 110 authenticates the first user credentials by way of any suitable technologies.

Once the first user credentials are authenticated, the configuration module 126 accesses the first user profile 114 from amongst several user profiles. The first user profile 114 is assigned to, for example, the username in the first user credentials. The first user profile 114 includes an identifier for the first disk 118 and an identifier for the first NIC 122. A user profile can be created based upon a request received from the organization, where, for instance, the request is received by way of an administrative webpage. This request can be received when the organization registers with the multi-user VM platform 100. In another example, the request can be received after the organization has registered with the multi-user VM platform 100 and is requesting addition of a user. When the first user profile 114 does not include the identifier for the first disk 118 and the identifier for the first NIC 122, the multi-user VM platform 100 can identify an available disk and available NIC and assign the disk and NIC to the first user profile 114, such that the identifier for the first disk 118 and the identifier for the first NIC 122 are included in such profile 114.

In some examples, the identifier for the first disk 118 and the identifier for the first NIC 122 are unique to the first user profile 114; therefore, no other user profile includes the identifier for the first disk 118 or the identifier for the first NIC 122. In addition, the first user profile 114 may include an identifier for the client VM 112. For example, the client VM 112 can be amongst several client VMs that are persisted in the multi-user VM system 110, and the first user profile 114 can uniquely identify the client VM 112 from amongst the several client VMs. In another example, the first user profile 114 can identify an organization that is assigned to the first username, and the client VM 112 is amongst several client VMs that are assigned to the organization.

The client VM 112 (and optionally several other client VMs backed by the hardware resources 108) is persisted in the multi-user VM system 110. While the multi-user VM system 110 may hibernate the client virtual VM 112 if no connection is established with the client virtual VM 112 for a threshold amount of time, the multi-user VM system 110 continuously allocates a portion of the hardware resources 108 to the client VM 112 so that the client VM 112 is continuously available to users assigned to the client VM 112.

The configuration module 126 identifies the client VM 112 (from amongst several client VMs), the first disk 118, and the first NIC 122 based upon the identifier of the client VM 112 (or the organization) in the first user profile 114, the identifier for the first disk 118, and the identifier for the first NIC 122, respectively. When the first user profile explicitly identifies the client VM 112, the configuration module 126 ascertains whether the client VM 112 is currently connected to a client computing device. For instance, the configuration module 126 can determine whether the client VM 112 is participating in a session and has a session host assigned thereto. When the configuration module 126 determines that the client VM 112 is participating in a session, the configuration module 126 can prevent the first user from accessing the client VM 112. Thus, much like a conventional desktop computing device, the client VM 112 cannot be employed by two users at one time. In an example, the VM platform 100 can include several client VMs that are assigned to the organization; when a request to access a VM is received from a client computing device, the configuration module 126 can identify a VM assigned to the organization that is not involved in a communication session and initiate a session with the identified VM. In another example, the platform 100 can provide a user with limited computing functionality (e.g., a backup disk and backup NIC), where the platform 100 provides the user with at least some computing resources (e.g., access to shared storage of an organization).

When the first user profile 114 identifies the organization but does not explicitly identify the client VM 112, the configuration module 126 can identify a client VM 112 not currently in a session (e.g., not having a session host assigned thereto). For example, an organization may specify that the multi-user VM system 110 is to persist 1000 client VMs, and the configuration module 126, upon receiving a request to connect with a client VM, identifies an "open" client VM from amongst the 1000 client VMs persisted by the multi-user VM system 110 for the organization.

Once the configuration module 126 has determined that the client VM 112 is not currently within a session, the configuration module 126 establishes a session between the client VM 112 and the client computing device 102. Specifically, the configuration module 126 attaches the first disk 118 identified in the first user profile 114 to the client VM 112. The first disk 118 includes data that corresponds to the first username, and therefore the first user 132. For instance, the first disk 118 includes applications used by the first user 132, files created by the first user 132, configuration settings set forth by the first user 132 (e.g., graphical user interface layouts, font preferences), and so forth. The configuration module 126 additionally attaches the first NIC 122 identified in the first user profile 114 to the client VM 112, thereby customizing the client VM 112 for the first username, and therefore the first user 132. Moreover, the configuration module 126 assigns the first username as the session host for the client VM 112, where such assignation indicates that the client VM 112 is being employed by the first user 132. Hence, if another user attempted to access or otherwise use the client VM 112 when the first username is assigned as the host, the platform 100 can determine that the client VM 112 is unavailable (and can optionally locate a client VM that does not have a session host assigned thereto). The client VM 112 can then transmit graphical data to the client computing device client computing device 104 (by way of the client application 130). As the first disk 118 includes data that is specific to the first user 132 (e.g., installed applications, files, settings), the graphical data is based upon the data included in the first disk 118. The client VM 112 transmits the graphical data to the client computing device 104 by way of the first NIC 122.

As noted above, the first user 132 may be assigned a first shift, and at time $T_2$, at the completion of the shift, the client computing device 104 receives an indication that the first user 132 is logging out of the client VM 112. The client application 130 transmits the indication to the computing system 102, and such indication is received by the configuration module 126. The configuration module 126, based upon such indication, ends the session between the client VM 112 and the client computing device 104. Specifically, the configuration module 126 detaches the first disk 118 from the first VM 112 and detaches the first NIC 122 from the client VM 112. Further, the configuration module 126 deletes the first username as the session host for the client VM 112, thereby ending the session between the client VM 112 and the client computing device 104.

At time $T_3$, subsequent to time $T_2$, the client application 130 receives second user credentials from the second user 132; the second user credentials can be or include a second username, a second password, second biometric information, etc. The client application 130 causes the client computing device 104 to transmit the second user credentials to the computing system 102 by way of the network 106. The multi-user VM system 110 authenticates the second user credentials by way of any suitable technologies.

In response to the second user credentials being authenticated, the configuration module 126 accesses the second user profile 116 from amongst the several user profiles. The second user profile 116 is assigned to, for example, the second username in the second user credentials. The second user profile 116 includes an identifier for the second disk 120 and an identifier for the second NIC 124. In some examples, the identifier for the second disk 120 and the identifier for the second NIC 124 are unique to the second user profile 114; therefore, no other user profile includes the identifier for the second disk 120 or the identifier for the second NIC 124. In addition, the second user profile 116 can include an identifier for the client VM 112. In another example, the second user profile 116 can identify an organization that is assigned to the second username, and the client VM 112 is amongst several client VMs that are assigned to the organization.

The configuration module 126 identifies the client VM 112 (from amongst several client VMs), the second disk 120, and the second NIC 124 based upon the identifier of the client VM 112 (or the organization) in the second user profile 116, the identifier for the second disk 120, and the identifier for the second NIC 124, respectively. When the second user profile 116 explicitly identifies the client VM 112, the configuration module 126 can ascertain whether the client VM 112 currently has a session host assigned thereto. In the example scenario described herein, as the first user 132 has logged out of the client VM 112, the client VM 112 is not assigned a session host. Upon determining that the client VM 112 does not currently have a session host assigned thereto, the configuration module 126 establishes a session between the client VM 112 and the client computing device 102. Specifically, the configuration module 126 attaches the second disk 120 identified in the second user profile 116 to the client VM 112. The second disk 120 includes data that corresponds to the second username, and therefore the second user 134. For instance, the second disk 120 includes applications used by the second user 134, files created by the second user 134, configuration settings set forth by the second user 134 (e.g., graphical user interface layouts, font preferences), and so forth. The configuration module 126 additionally attaches the second NIC 124 identified in the second user profile 116 to the client VM 112, thereby customizing the client VM 112 for the second username, and therefore the second user 132. Moreover, the configuration module 126 assigns the second username as the session host for the client VM 112. The client VM 112 can then transmit graphical data to the client computing device 104 (by way of the client application 130). As the second disk 120 includes data that is specific to the second user 134 (e.g., installed applications, files, settings), the graphical data is based upon the data included in the second disk 120. The client VM 112 transmits the graphical data to the client computing device 104 by way of the second NIC 124.

The technologies described herein exhibit various advantages over conventional technologies that offer VMs for users of an organization. As noted above, a single client VM (e.g., the client VM 112) can be employed by several different users of the organization at different, non-overlapping times. Thus, the computing system 102 need not persist a client VM for each registered user, and thus the hardware resources 108 are more efficiently used when compared to conventional technologies. In addition, as the multi-user VM system 110 allocates different disks to different registered users, the multi-user VM system 110 provides each user with an experience that is customized based upon preferences of the user, and also preserves privacy of registered users (as a user is restricted to accessing a disk assigned to the user). Furthermore, use of a distinct NIC for each user profile results in a distinct MAC address for each user profile. Accordingly, access to content can be restricted based upon MAC address, which can be specific to the NICs (and thus to respective users).

With reference to FIG. 2, a functional block diagram of a multi-user VM platform 200 is illustrated. The platform 200 comprises a server computing device 202, a computing resource pool 214, a user pool 230, a user device pool, 232, a client VM pool 250, and a client host pool 260. The server computing device 202 comprises a processor 204 and memory 206. The memory 206 has a server VM application 208 installed thereon, that, when executed by the processor 204, causes the processor to perform functionality associated with the server VM application 208. The server VM application 208 comprises a provisioning module 210 that allocates computing resources from the computing resource pool 214 and facilitates the creation of one or more VMs at the VM pool 250. The server VM application 208 further comprises a user rotation module 212 that facilitates rotation of users at a VM in VM pool 250, for example, via the configuration module 126.

The computing resource pool 214 comprises processing resources 216, memory resources 218, and disk resources 220. The computing resource pool 214 may be managed by a VM service provider. The computing resources in the computing resource pool 214 may be allocated specifically to an organization or may represent a larger shared computing resource pool for multiple organizations. The processing resources 216 may be embodied as individual processor cores that may be allocated to create a virtual multicore processor in a VM in the client VM pool 250. The memory resources 218 are allocated as a portion of available memory, for example, 4 GB RAM, etc., at a VM in the client VM pool 150. The disk resources 220 are allocated according to a disk size as well as a disk type. For example, a 2 TB HDD, a 400 GB SSD, etc., or any portion thereof, may be allocated from the computing resource pool 214 as part of a VM in the client VM pool 250. While the allocation of computing resources from the computing resource pool 214 is represented as discrete virtual computing specifications (e.g., 4 2.2 Ghz processing cores, 8 GB memory), it is appreciated that the resources within computing resource pool 214 comprise physical CPU, memory, and disk components.

The user pool 230 comprises the first user 132, the second user 134, through an Nth user 231. The user pool 230 comprises users in an organization who are identified by the organization as having access to a VM in the client VM pool 250. The user device pool 232 comprises a first user device 234 through user device M 236. The user device pool is representative of user devices operable to connect to a VM in the client VM pool 250 via execution of an installed client application. Users in the user pool 230 may utilize computing devices provided to them by their organization and/or their own computing devices so long as the user computing device is operable to execute the client application.

The client VM pool 250 comprises a plurality of VMs 222-224. The number of client VMs in the client VM pool 250 may vary according to an organization's user pool and their overall computing needs. In an example, an organization may have 300 users in the user pool 230 assigned to 100

VMs in the client VM pool 250. Each VM may then be operated by multiple users utilizing the multi-user rotation operation as described herein during separate shifts.

The configuration module 126 is configured to monitor usage of the client VMs 222-224 in the client VM pool 250. The configuration module 126 is further configured to configure client VMs 222-224 within the client VM pool 250, such as, for example, by applying configuration information from a user profile retrieved from the client host pool 260. In some embodiments, the configuration module 126 receives user rotation instructions from the user rotation module 212. The configuration module 126 is further configured to communicate status information related to one or more VMs 222-224 in the client VM pool 250 to the server VM application 208. For example, the configuration module 208 may alert the server VM application 208 when a new session host is assigned (e.g., responsive to a login), when a session host has been removed (e.g., responsive to a logout), and/or when a VM is idle.

The client host pool 260 comprises a plurality of user profiles, for example, the first user profile 114, the second user profile 116, through a Qth user profile 226. The number of user profiles in the client host pool 260 is equal to the number of users in the user pool 230. The client host pool 260 also includes disks 262 and NICs 264 that are identified in the user profiles 114-116.

Exemplary operation of the multi-user VM platform 200 is further explained through the following examples. In a first example, multiple users can access a client VM by way of a shared client computing device. In an example, an organization has two users, user 1 and user 2. User 1 operates a shared client computing device 234 during a first shift from 8:00 am-5:00 pm. User 2 operates the same user computing device 234 during a second shift from 6:00 pm-3:00 am. The use of the shared user computing device 234 therefore does not overlap between the first and second user. Because use of the computing device 234 by User 1 and User 2 does not overlap, computing resources in the client VM pool 250 can be shared, thereby conserving total computing resources. Upon a startup initialization of the client VM pool 250, provisioning module 210 creates a client VM (e.g., client VM 222) that is to be shared between user 1 and user 2. The creation of the client VM comprises allocation of computing resources from a computing resource pool 214. In addition, the provisioning module 210 allocates a first disk to user 1 and a first NIC to user 1, and further allocates a second disk to user 2 and a second NIC to user 2 (from the client host pool 260).

The provisioning module 210 creates or updates user profiles (e.g., user profiles 114 and 116) for the two users to include appropriate identifiers; as described above, the first user profile 114 includes an identifier of the client VM 222, an identifier of a first disk, and an identifier of a first NIC. Similarly, the second user profile 116 includes an identifier of the client VM 222, an identifier of a second disk, and an identifier of a second NIC.

When the first user 132 starts their shift, they input user credentials and/or other identifying information into client application 130. Responsive to receiving the user input, the client application 130 generates a login request and transmits the login request to the configuration module 126. The configuration module 126 identifies the first user profile 118 within the client host pool 260. The configuration module 126 assigns the first username for the first user 132 as the session host of the client VM 222 and attaches the first disk 118 and the first NIC 122 to the client VM 222. As the first username is now the assigned session host, the first user 132 may interact with the client VM 222 via the client application 130.

When the first user 132 has completed their shift, a logout request is generated at the client application 130 and transmitted to the configuration module 126. Responsive to the logout request, the configuration module 126 detaches the first disk 118 and the first NIC 122 and assigns the first user profile 118 (back to the client host pool 260). As the first user's shift has ended, the second user 134 may then generate a login request at the client application 130. Upon receiving the second user's login request, the configuration module 126 identifies the second user profile 116 associated with the second user from the client host pool 260. The second user profile 116 identifies the second disk 120 and the second NIC 124. The second disk 120 identified in the second user profile is unique to the second user 134.

The configuration module 126 may then attach the second user's disk 120 and NIC 124 at the client VM 222 and enable the second user 134 to use the client VM 222 via the client application 130. When the second user's shift ends, a logout request is sent from the client application 130 to the configuration module 126, and the configuration module 126 may then detach the disk 120 and NIC 124 associated with the second user 134 and assign the second user profile 124 back to the client host pool 260. The above-described user rotation process may be repeated for each shift transition between the first and second user.

In another example, users can access a shared VM using different client computing devices. Thus, an organization may have two users, user 1 and user 2. User 1 operates a first user computing device during a first shift from 8:00 am-5:00 pm. User 2 operates a second user computing device during a second shift from 6:00 pm-3:00 am, relative to the same time zone. When the first user starts their shift, they input user credentials and/or other identifying information into client application 130 executing on the first user computing device. Responsive to receiving the user input, the client application 130 generates a login request and transmits the login request to the configuration module 126. In certain embodiments, the configuration module 126 may evaluate location data or other geolocation information to determine the location of the first user computing device. If the location of a user computing device is not within an allowed area, the configuration module may reject the login request.

Responsive to a determination that the login request is from the first user, the configuration module 126 identifies the first user profile 114 within the client host pool 260. The first user profile 114 identifies the disk 118 and NIC 122 associated with the first user 132. The configuration module 126 assigns the first user profile 114 as the session host of the VM 222 and attaches NIC 122 and disk 118 to the VM 222. As they are now the session host, the first user 132 may interact with the client VM 222 via the client application 130.

When the first user 132 has completed their shift, a logout request may be generated at the client application 130 and transmitted to the configuration module 126. In certain embodiments, a logout request is automatically generated responsive to the end of the first user's shift; for example, if the first user's shift ends at 5:00 pm, the client application 130 generates a logout request at 5:00 pm. Responsive to the logout request, the configuration module 126 detaches the disk 118 and NIC 122 associated with the first user 132 and assigns the first user profile 114 back to the client host pool 260. As the first user's shift has ended, the second user 134 may begin their shift. When the second user 134 starts their shift, they input user credentials and/or other identifying information into a client application 130 executing on the second user computing device. Responsive to receiving the user input, the client application 130 generates a login request and transmits the login request to the configuration module 126. In certain embodiments, the configuration module 126 may evaluate location data or other geolocation information to determine the location of the second user computing device, and if the second user computing device is not in a permitted location, the login request may be rejected by the configuration module 126.

Upon receiving the second user's login request, the configuration module 126 identifies the second user profile 116 from the client host pool 260. The second user profile 116 identifies the second disk 120 and the second NIC 124 associated with the second user. The second disk 120 identified in the second user profile 116 is unique to the second user 134. The configuration module 126 then attaches the second user's disk 120 and NIC 124 at the client VM 222 to enable the second user 134 to use the client VM 122 via the client application 130. When the second user's shift ends, a logout request is sent from the client application 130 to the configuration module 126, and the configuration module 126 may then detach the disk 120 and NIC 124 associated with the second user 134 and assign the second user profile 116 back to the client host pool 260. The above described user rotation process may be repeated for each shift transition between the first and second user.

Figure 3:
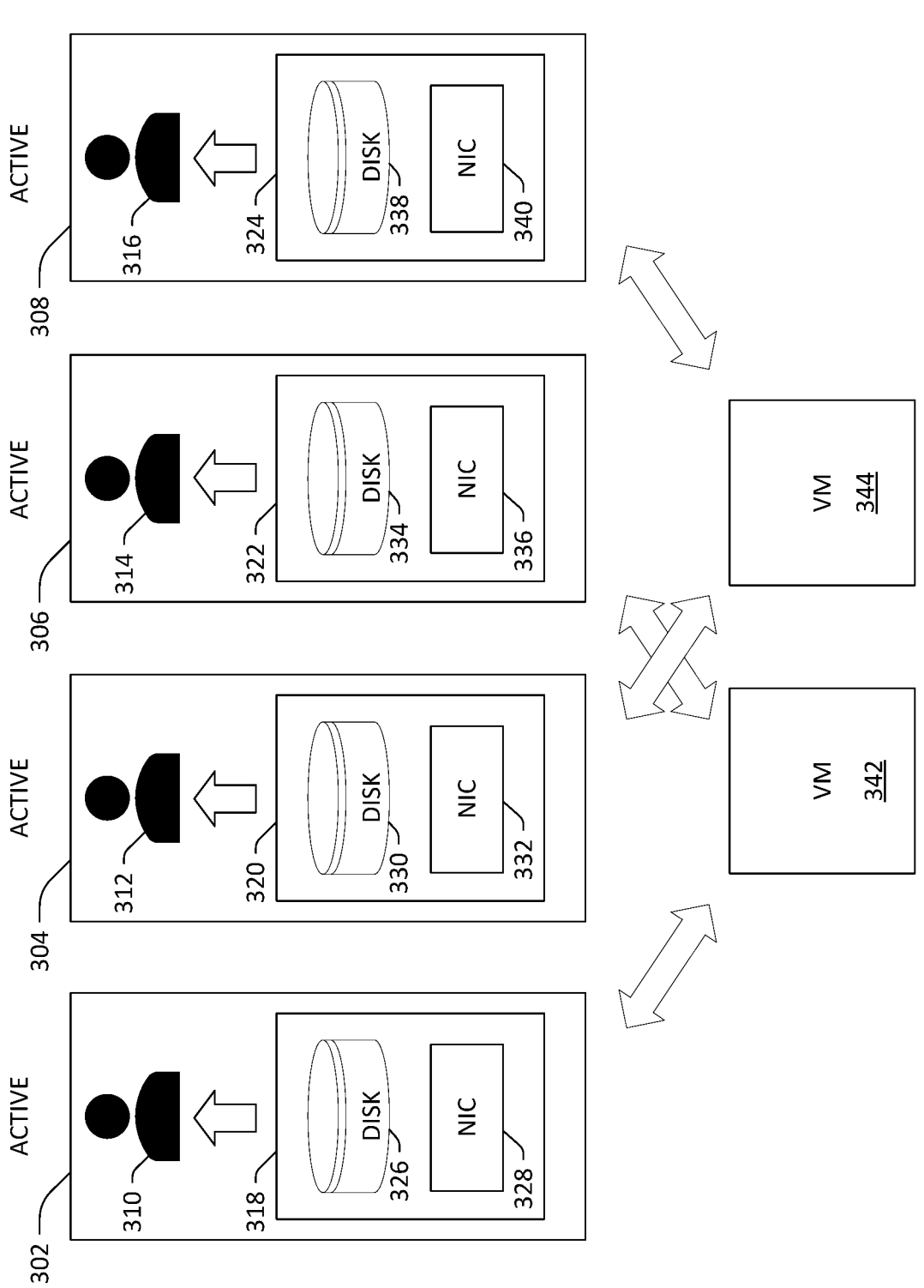
FIG. 3 is a schematic diagram that illustrates that users in an organization are assigned different hardware resources that can be attached to client VMs.

FIG. 3 is a schematic diagram that depicts aspects described herein. As illustrated in FIG. 3, an organization has several active user accounts 302-308. The active user accounts 302-308 correspond to respective users 310-316 who belong to or are otherwise associated with the organization. The user accounts 302-308 indicate that the users 310-316 are assigned hardware resources 318-324 that are unique to the users 310-316. Specifically, the user 302 is assigned a first disk 326 and a first NIC 328, the user 304 is assigned a second disk 330 and a second NIC 332, the user 306 is assigned a third disk 334 and a third NIC 336, and the user 308 is assigned a fourth disk 338 and a fourth NIC 340.

In contrast to conventional technologies, each user account is not assigned an independent VM. Rather, in FIG. 3, a first VM 342 is assigned to the first user account 302 and the third user account 306, while a second VM 344 is assigned to the second user account 304 and the fourth user account 308. Thus, the first user 310 and the third user 314 can both utilize the first VM 342, so long as the first user 310 and the third user 314 are not simultaneously using the first VM 342. Similarly, the second user 312 and the fourth user 316 can both utilize the second VM 344, so long as the second user 312 and the fourth user 316 are not simultaneously using the second VM 344. In addition, since each user account is assigned unique computer-readable storage and a unique NIC, each user is provided with their own customized experience with the VMs (despite the "sharing" of VMs).

Figure 4:
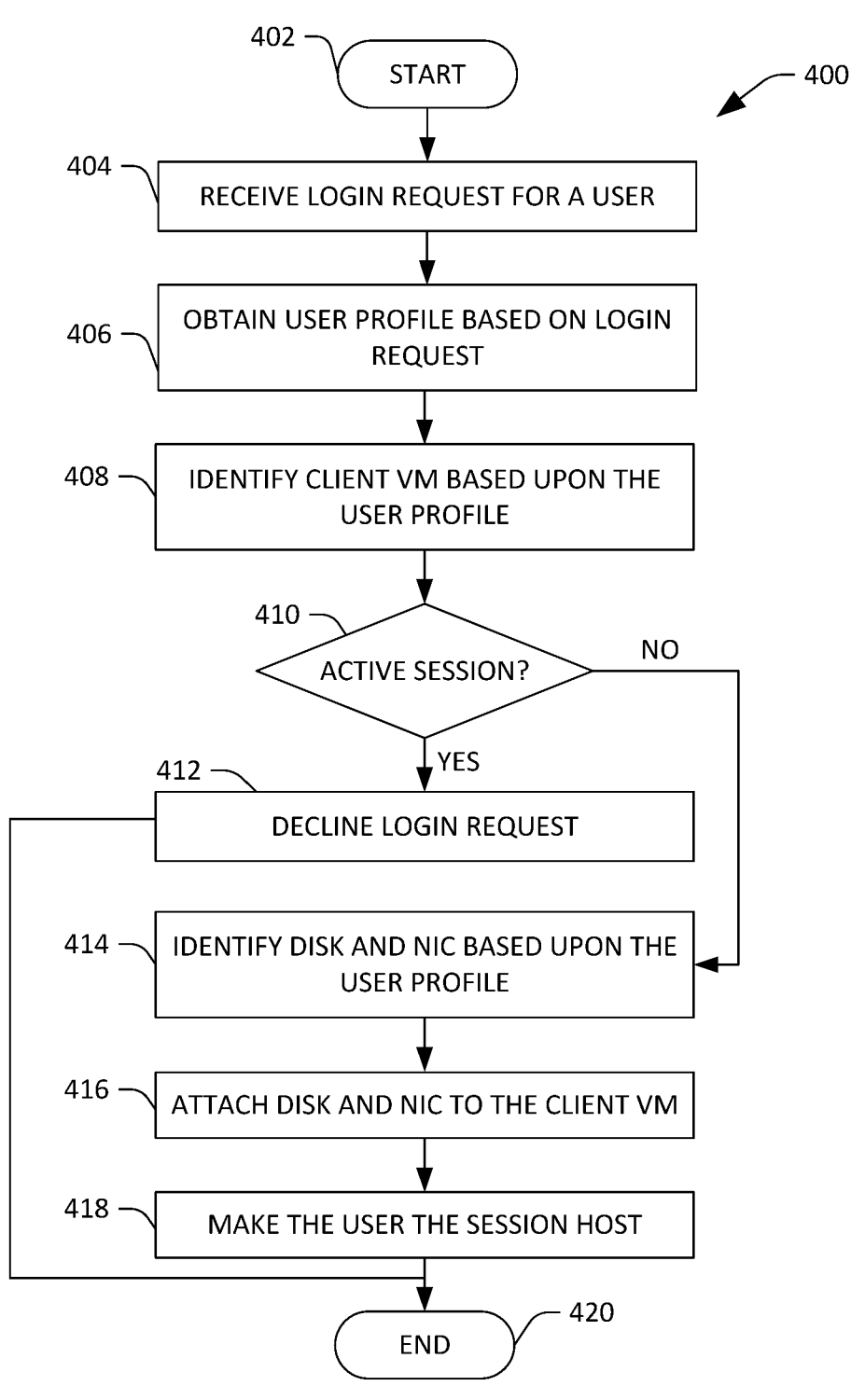
FIG. 4 is a flow diagram that illustrates a method for attaching a disk and NIC to a client VM.
Figure 5:
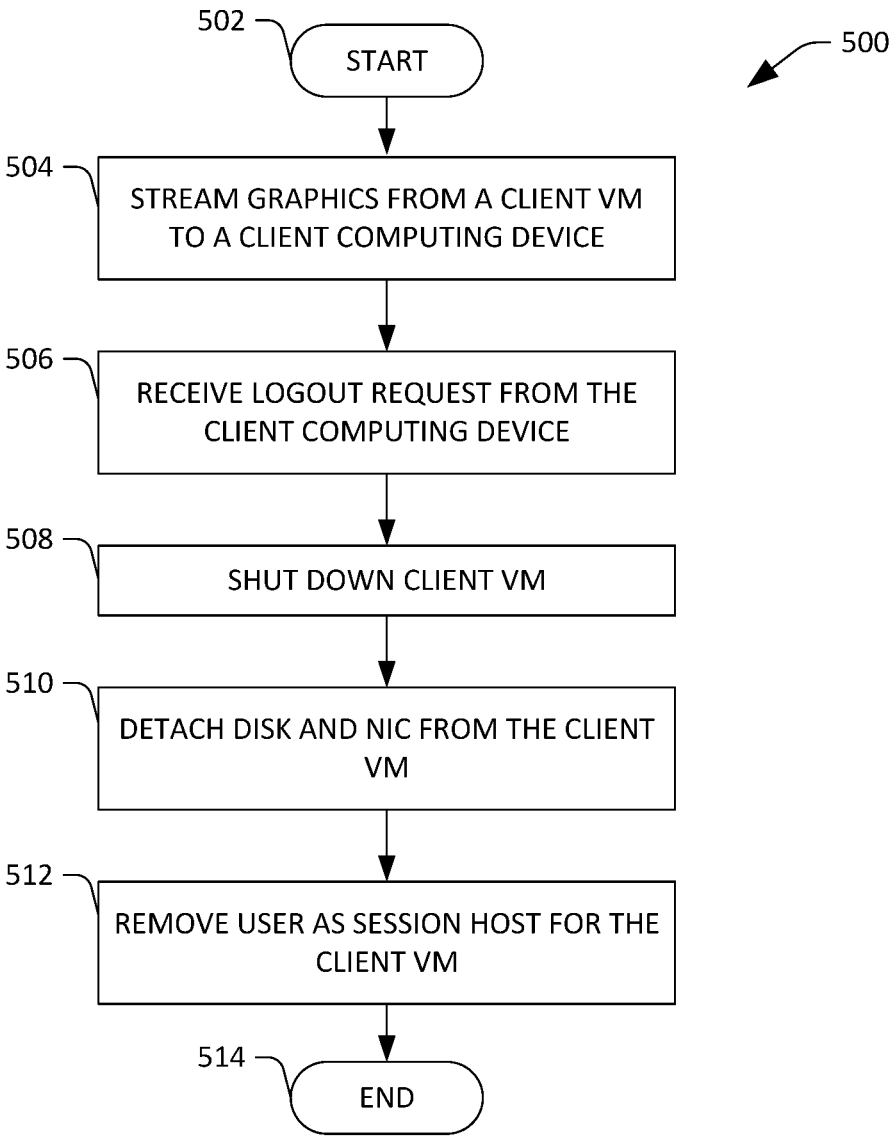
FIG. 5 is a flow diagram that illustrates a method for detaching a disk and NIC from a client VM.

FIGS. 4 and 5 illustrate methods relating to a multi-user VM platform. While the methods are shown and described as being a series of acts that are performed in a sequence, it is to be understood and appreciated that the methods are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodology can be stored in a computer-readable medium, displayed on a display device, and/or the like.

Referring to FIG. 4, a method 400 for providing access to a shared VM is illustrated. The method 400 starts at 402, and at 404 a login request is received from a user. The user may be one of a plurality of users who have an account with a multi-user shared VM platform. At 406 a user profile for the user is obtained based on the login request. At 408, a client VM is identified based upon the user profile. For example, the user profile for the user can include an identifier for the client VM. At 410, a determination is made as to whether the client VM is involved in an active session with a client computing device. For instance, a determination is made as to whether a user is assigned as a session host for the client VM. When it is determined at 410 that the client VM is involved in an active session, the method 400 proceeds to 412 where the login request for the user is declined. In another example, when it is determined at 410 that the client VM is involved in an active session, a determination is made as to whether another persisted VM assigned to the organization is available; when there is another persisted VM available, the another persisted VM is assigned to the user. When there are no other persisted VMs assigned to the organization, in an example, a new VM can be instantiated and assigned to the user.

When it is determined that the client VM is not involved in an active session with a client computing device (or when another VM is assigned to the user), then at 414 a disk and NIC are identified based upon the user profile. For instance, the disk and NIC are identified in the user profile and are unique to the user profile. At 416, the disk and NIC are attached to the client VM, and at 418 the user (i.e., an identifier of the user) is assigned as a session host for the client VM. Accordingly, the client VM is customized for the user and can only be used by the user until the user logs out of the client VM. The method 400 completes at 420.

With reference now to FIG. 5, a method 500 for detaching a disk and NIC from a client VM is depicted. The method 500 starts at 502, and at 504 graphics are streamed from a client VM to a client computing device. The graphics can be graphical user interface features of an operating system and/or applications being executed by the client VM. At 506, a logout request is received from a user of the client computing device, where the logout request indicates that the user wishes to logout from the client VM. AT 508, the client VM is shut down in response to the logout request. At 510, a disk and NIC that were attached to the VM are detached from the VM. Therefore, when a different user logs into the client VM, the different user will not have access to the contents of the disk. At 512, the user is removed as a session host for the client VM, thereby indicating that the different user is able to log into the client VM. The method 500 completes at 514.

Figure 6:
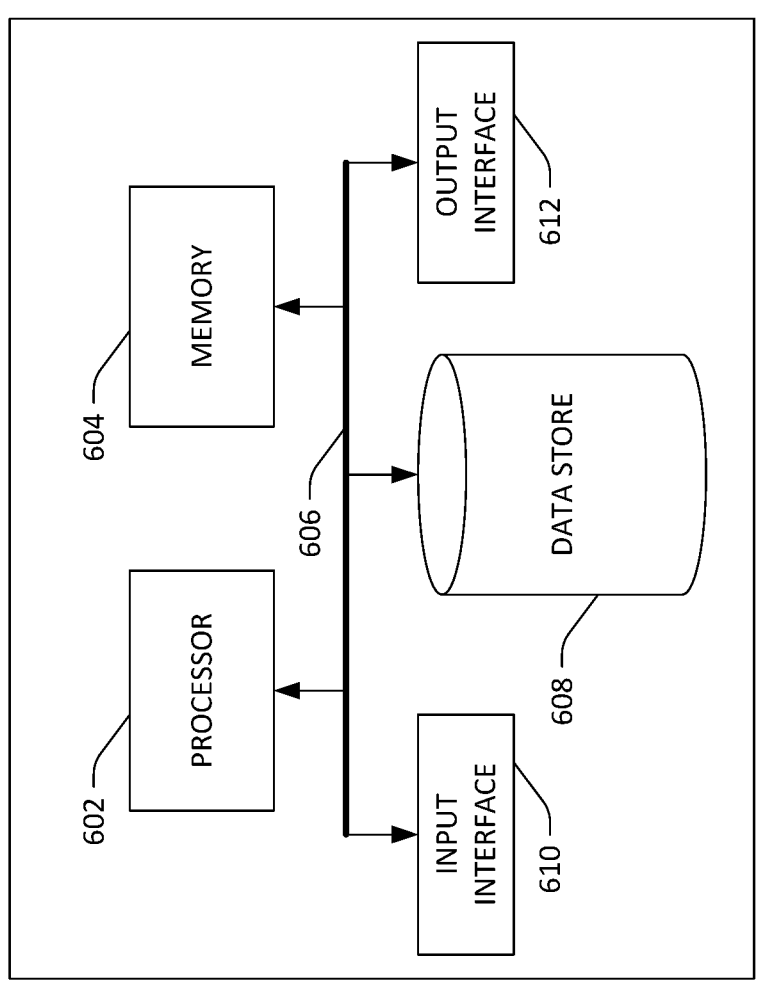
FIG. 6 is a functional block diagram of a computing device.

Referring now to FIG. 6, a high-level illustration of an example computing device 600 that can be used in accordance with the systems and methodologies disclosed herein is illustrated. It is appreciated that computing device 130 is one exemplary implementation of computing device 600. The computing device 600 includes at least one processor 602 that executes instructions that are stored in a memory 604. The instructions may be, for instance, instructions for implementing functionality described as being carried out by one or more components discussed above or instructions for implementing one or more of the methods described above. The processor 602 may access the memory 604 by way of a system bus 606.

The computing device 600 additionally includes a data store 608 that is accessible by the processor 602 by way of the system bus 606. The data store 608 may include executable instructions, documents, output data such as the location and nature of identified common document substrings, etc. The computing device 600 also includes an input interface 610 that allows external devices to communicate with the computing device 600. For instance, the input interface 610 may be used to receive instructions from an external computer device, from a user, etc. The computing device 600 also includes an output interface 612 that interfaces the computing device 600 with one or more external devices. For example, the computing device 600 may display text, images, etc. by way of the output interface 612.

It is contemplated that the external devices that communicate with the computing device 600 via the input interface 610 and the output interface 612 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 600 in a manner free from constraints imposed by input devices such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 600 may be a distributed system. Thus, for instance, several devices may be in communication by way of a network connection and may collectively perform tasks described as being performed by the computing device 600.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium.

Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Features described herein pertain to the following examples.

(A1) In accordance with an aspect, a method includes receiving a request to log in to a VM from a client computing device that is being operated by a user. In an example, the VM is to act as a personal computing device for the user. The method also includes obtaining a user profile in response to receiving the request, where the user profile includes an identifier for persistent computer-readable storage that is unique to the user profile. The method further includes attaching the persistent computer-readable storage to the VM based upon the identifier for the persistent computer-readable storage included in the user profile, where a configuration of the VM is based upon content of the persistent computer-readable storage. The method additionally includes streaming graphical data from the VM to the client computing device.

(A2) In some embodiments of the method of (A1), the user profile further includes an identifier for a network interface controller (NIC) that is unique to the user profile. The method also includes attaching the NIC to the VM based upon the identifier for the NIC being included in the user profile, where the graphical data is streamed to the client computing device by way of the NIC.

(A3) In some embodiments of at least one of the methods of (A1)-(A2), the user profile further includes an identifier for the VM. The method also includes prior to attaching the persistent storage to the VM, determining that the VM is not in a communication session with another client computing device, wherein the persistent storage is attached to the VM in response to determining that the VM is not in the communication session with another client computing device.

(A4) In some embodiments of at least one of the methods of (A1)-(A3), the persistent computer-readable storage is a portion of a solid state drive.

(A5) In some embodiments of at least one of the methods of (A1)-(A4), the user profile further includes an identifier of an organization that employs the user. The method also includes identifying the VM based upon the identifier for the organization included in the user profile.

(A6) In some embodiments of at least one of the methods of (A1)-(A5), the method also includes receiving a logout request from the client computing device subsequent to streaming the graphical data to the client computing device. The method further includes detaching the persistent storage from the VM in response to receiving the logout request, wherein the VM is persisted at the computing system subsequent to the persistent storage being detached from the VM.

(A7) In some embodiments of the method of (A6), the method also includes receiving a second request to login to the VM from the client computing device subsequent to the persistent storage being detached from the VM, where the second request identifies a second user. The method further includes obtaining a second user profile based upon the second request to login to the VM, where the second user profile includes a second identifier for second persistent computer-readable storage that is unique to the second user profile. The method additionally includes attaching the second persistent computer-readable storage to the VM based upon the second identifier for the second persistent storage included in the second user profile. The method also includes streaming second graphical data to the client computing device.

(A8) In some embodiments of the method of (A6), the method also includes receiving a second request to login to the VM from a second client computing device subsequent to the persistent storage being detached from the VM, where the second request identifies a second user, and further where the VM is to act as a personal computing device of the second user. The method further includes obtaining a second user profile based upon the second request to login to the VM, where the second user profile includes a second identifier for second persistent computer-readable storage that is unique to the second user profile. The method additionally includes attaching the second persistent computer-readable storage to the VM based upon the second identifier for the second persistent storage included in the second user profile. The method also includes streaming second graphical data to the second client computing device, where the second graphical data is based upon content included in the second persistent storage.

(A9) In some embodiments of at least one of the methods of (A1)-(A8), the method also includes receiving a second request to login to the VM from a second client computing device while the persistent storage is attached to the VM, where the second request identifies a second user. In an example, the VM is to act as a personal computing device of the second user.

(B1) In another aspect, a method performed at a computing system that includes a multi-user VM platform includes receiving a request to login to a VM from a client computing device that is being operated by a user. The method also includes obtaining a user profile based upon the request to login to the VM, where the user profile includes an identifier for a NIC that is unique to the user profile. In an example, the VM is to act as a personal computing device of the user. The method additionally includes attaching the NIC to the VM based upon the identifier for the NIC being included in the user profile. The method further includes streaming graphical data to the client computing device by way of the NIC subsequent to attaching the NIC to the VM. In an example, the graphical data is streamed from the VM.

(B2) In some embodiments of the method of (B1), the user profile further includes an identifier for persistent computer-readable storage that is unique to the user profile. The method also includes attaching the persistent computer-readable storage to the VM based upon the identifier for the persistent computer-readable storage being included in the user profile, where the graphical data streamed to the client computing device is based upon data in the persistent computer-readable storage.

(B3) In some embodiments of at least one of the methods of (B1)-(B2), the user profile further includes an identifier for the VM. The method also includes determining that the VM is not in a communication session with another client computing device prior to attaching the NIC to the VM, where the NIC is attached to the VM in response to determining that the VM is not in the communication session with another client computing device.

(B4) In some embodiments of at least one of the methods of (B1)-(B3), the NIC is a virtual NIC.

(B5) In some embodiments of at least one of the methods of (B1)-(B4), the user profile further includes an identifier of an organization that employs the user. The method additionally includes identifying the VM based upon the identifier for the organization included in the user profile.

(B6) In some embodiments of at least one of the methods of (B1)-(B5), the method also includes receiving a logout request from the client computing device subsequent to streaming the graphical data to the client computing device. The method further includes detaching the NIC from the VM in response to receiving the logout request, where the VM is persisted at the computing system subsequent to the NIC being detached from the VM.

(B7) In some embodiments of the method of (B6), the method also includes receiving a second request to login to the VM from the client computing device subsequent to NIC being detached from the VM, where the second request identifies a second user. In an example, the VM is to act as a personal computing device of the second user. The method further includes obtaining a second user profile based upon the second request to login to the VM, where the second user profile includes a second identifier for a second NIC that is unique to the second user profile. The method additionally includes attaching the second NIC to the VM based upon the second identifier for the NIC included in the second user profile. The method also includes streaming second graphical data to the client computing device by way of the second NIC. In an example, the VM streams the second graphical content to the client computing device.

(B8) In some embodiments of the method of (B6), the method also includes receiving a second request to login to the VM from a second client computing device subsequent to the NIC being detached from the VM, where the second request identifies a second user. In an example, the VM is to act as a personal computing device of the second user. The method further includes obtaining a second user profile based upon the second request to login to the VM, where the second user profile includes a second identifier for a second NIC that is unique to the second user profile. The method additionally includes attaching the second NIC to the VM based upon the second identifier for the second NIC included in the second user profile. The method also includes streaming second graphical data to the second client computing device by way of the second NIC. In an example, the VM streams the second graphical content to the client computing device.

(C1) In still yet another aspect, a method includes receiving a request to login to a VM from a client computing device that is being operated by a user. In an example, the VM is to act as a personal computing device of the user. The method also includes obtaining a user profile based upon the request to login to the VM. The user profile includes: 1) an identifier for persistent computer-readable storage that is unique to the user profile; and 2) an identifier for a NIC that is unique to the user profile. The method further includes attaching the persistent computer-readable storage to the VM based upon the identifier for the persistent storage being included in the user profile. The method additionally includes attaching the NIC to the VM based upon the identifier for the NIC being included in the user profile. The method also includes streaming graphical data to the client computing device, where the graphical data is streamed to the client computing device by way of the NIC. In an example, the VM streams the graphical data to the client computing device.

(C2) In some embodiments of the method of (C1), the method also includes receiving a logout request from the client computing device subsequent to streaming the graphical data to the client computing device. The method further includes detaching the persistent storage and the NIC from the VM in response to receiving the logout request, where the VM is persisted at the computing system subsequent to the persistent storage and the NIC being detached from the VM.

(C3) In some embodiments of the method of (C2), the method also includes receiving a second request to login to the VM from the client computing device subsequent to persistent storage and the NIC being detached from the VM, where the second request identifies a second user. In an example, the VM is to act as a personal computing device of the second user. The method further includes obtaining a second user profile based upon the second request to login to the VM, where the second user profile includes: 1) an identifier for second persistent storage that is unique to the second user profile; and 2) an identifier for a second NIC that is unique to the second user profile. The method also includes attaching the second NIC to the VM based upon the identifier for the second NIC included in the second user profile. The method additionally includes streaming second graphical data to the client computing device by way of the second NIC. In an example, the VM streams the second graphical data to the client computing device.

(D1) In still yet another aspect, a computing system includes a processor and memory, where the memory stores instructions that, when executed by the processor, cause the processor to perform at least one of the methods disclosed herein (e.g., any of methods (A1)-(A9), (B1)-(B8), or (C1)-(C3)).

(E1) In yet another aspect, a computer-readable storage medium includes instructions that, when executed by a processor, causes the processor to perform at least one of the methods disclosed herein (e.g., any of methods (A1)-(A9), (B1)-(B8), or (C1)-(C3)).

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computing system comprising:
   a processor; and
   memory storing instructions that, when executed by the processor, cause the processor to perform acts comprising:

receiving a request to log in to a virtual machine (VM) from a client computing device that is being operated by a user, wherein the VM is a shared VM among a plurality of users that access the shared VM during non-overlapping sessions;
in response to receiving the request:
   obtaining a user profile, where the user profile includes an identifier for persistent storage that is unique to the user profile;
   dynamically attaching the persistent storage to the VM based upon the identifier for the persistent storage included in the user profile,
   wherein different persistent storages are attached for different users in successive login sessions, and
   wherein a configuration of the VM is based upon content of the persistent storage; and
streaming graphical data from the VM to the client computing device.

2. The computing system of claim 1, wherein the user profile further includes an identifier for a network interface card (NIC) that is unique to the user profile, the acts further comprising attaching the NIC to the VM based upon the identifier for the NIC being included in the user profile, wherein the graphical data is streamed to the client computing device by way of the NIC.

3. The computing system of claim 1, wherein the user profile further includes an identifier for the VM, the acts further comprising:
   prior to attaching the persistent storage to the VM, determining that the VM is not in a communication session with another client computing device, wherein the persistent storage is attached to the VM in response to determining that the VM is not in the communication session with another client computing device.

4. The computing system of claim 1, wherein the persistent storage is a portion of a solid state drive.

5. The computing system of claim 1, wherein the user profile further includes an identifier of an organization that employs the user, the acts further comprising identifying the VM based upon the identifier for the organization included in the user profile.

6. The computing system of claim 1, the acts further comprising:
   subsequent to streaming the graphical data to the client computing device, receiving a logout request from the client computing device; and
   in response to receiving the logout request, detaching the persistent storage from the VM, wherein the VM is persisted at the computing system subsequent to the persistent storage being detached from the VM.

7. The computing system of claim 6, the acts further comprising:
   subsequent to the persistent storage being detached from the VM, receiving a second request to login to the VM from the client computing device, where the second request identifies a second user;
   obtaining a second user profile based upon the second request to login to the VM, where the second user profile includes a second identifier for second persistent storage that is unique to the second user profile;
   attaching the second persistent storage to the VM based upon the second identifier for the second persistent storage included in the second user profile; and
   streaming second graphical data to the client computing device.

8. The computing system of claim 6, the acts further comprising:

subsequent to the persistent storage being detached from the VM, receiving a second request to login to the VM from a second client computing device, where the second request identifies a second user, and further where the VM is to act as a personal computing device of the second user;

obtaining a second user profile based upon the second request to login to the VM, where the second user profile includes a second identifier for second persistent computer readable storage that is unique to the second user profile;

attaching the second persistent storage to the VM based upon the second identifier for the second persistent storage included in the second user profile; and streaming second graphical data to the second client computing device, where the second graphical data is based upon content included in the second persistent storage.

9. The computing system of claim 1, the acts further comprising:

while the persistent storage is attached to the VM, receiving a second request to login to the VM from a second client computing device, where the second request identifies a second user;

in response to receiving the second request to login to the VM, determining that the VM is in an active session with the client computing device; and denying the second request to login to the VM upon determining that the VM is in the active session with the client computing device.

10. A method performed at a computing system that includes a multi-user virtual machine (VM) platform, the method comprising:

receiving a request to login to a VM from a client computing device that is being operated by a user, wherein the VM is a shared VM among a plurality of users that access the shared VM during non-overlapping sessions;

obtaining a user profile based upon the request to login to the VM, where the user profile includes an identifier for a network interface card (NIC) that is unique to the user profile;

dynamically attaching the NIC to the VM based upon the identifier for the NIC being included in the user profile; and streaming graphical data to the client computing device by way of the NIC.

11. The method of claim 10, wherein the user profile further includes an identifier for persistent computer-readable storage that is unique to the user profile, the method further comprising attaching the persistent computer-readable storage to the VM based upon the identifier for the persistent computer-readable storage being included in the user profile, wherein the graphical data streamed to the client computing device is based upon data in the persistent computer-readable storage.

12. The method of claim 10, wherein the user profile further includes an identifier for the VM, the method further comprising:

prior to attaching the NIC to the VM, determining that the VM is not in a communication session with another client computing device, wherein the NIC is attached to the VM in response to determining that the VM is not in the communication session with another client computing device.

13. The method of claim 10, wherein the NIC is a virtual NIC.

14. The method of claim 10, wherein the user profile further includes an identifier of an organization that employs the user, the method further comprising identifying the VM based upon the identifier for the organization included in the user profile.

15. The method of claim 10, further comprising:

subsequent to streaming the graphical data to the client computing device, receiving a logout request from the client computing device; and in response to receiving the logout request, detaching the NIC from the VM, wherein the VM is persisted at the computing system subsequent to the NIC being detached from the VM.

16. The method of claim 15, further comprising:

subsequent to the NIC being detached from the VM, receiving a second request to login to the VM from the client computing device, where the second request identifies a second user;

obtaining a second user profile based upon the second request to login to the VM, where the second user profile includes a second identifier for a second NIC that is unique to the second user profile;

attaching the second NIC to the VM based upon the second identifier for the NIC included in the second user profile; and streaming second graphical data to the client computing device by way of the second NIC.

17. The method of claim 15, further comprising:

subsequent to the NIC being detached from the VM, receiving a second request to login to the VM from a second client computing device, where the second request identifies a second user;

obtaining a second user profile based upon the second request to login to the VM, where the second user profile includes a second identifier for a second NIC that is unique to the second user profile;

attaching the second NIC to the VM based upon the second identifier for the second NIC included in the second user profile; and streaming second graphical data to the second client computing device by way of the second NIC.

18. A computing system that executes a virtual machine (VM), where the computing system comprises:

a processor; and memory storing instructions that, when executed by the processor, cause the processor to perform acts comprising:

receiving a request to login to the VM from a client computing device that is being operated by a user, wherein the VM is a shared VM among a plurality of users that access the shared VM during non-overlapping sessions;

dynamically obtaining a user profile based upon the request to login to the VM, where the user profile includes:

an identifier for persistent storage that is unique to the user profile; and an identifier for a network interface card (NIC) that is unique to the user profile;

dynamically attaching the persistent storage to the VM based upon the identifier for the persistent storage being included in the user profile;

dynamically attaching the NIC to the VM based upon the identifier for the NIC being included in the user profile; and streaming graphical data to the client computing device, where the graphical data is streamed to the client computing device by way of the NIC.

19. The computing system of claim 18, the acts further comprising:

subsequent to streaming the graphical data to the client computing device, receiving a logout request from the client computing device; and in response to receiving the logout request, detaching the persistent storage and the NIC from the VM, wherein the VM is persisted at the computing system subsequent to the persistent storage and the NIC being detached from the VM.

20. The computing system of claim 19, the acts further comprising:

subsequent to persistent storage and the NIC being detached from the VM, receiving a second request to login to the VM from the client computing device, where the second request identifies a second user;

obtaining a second user profile based upon the second request to login to the VM, where the second user profile includes:

an identifier for second persistent storage that is unique to the second user profile; and an identifier for a second NIC that is unique to the second user profile;

attaching the second persistent storage to the VM based upon the identifier for the second persistent storage included in the second user profile;

attaching the second NIC to the VM based upon the identifier for the second NIC included in the second user profile; and streaming second graphical data to the client computing device by way of the second NIC.

\* \* \* \* \*